Jan. 30, 1962 B. B. BAUER ETAL 3,019,303

TAPE RECORDING-PLAYBACK HEAD

Filed May 22, 1959 2 Sheets-Sheet 1

INVENTORS
BENJAMIN B. BAUER
HARVEY SHERMAN
BY
Brumbaugh, Free, Graves & Donohue
THEIR ATTORNEYS Jan. 30, 1962 B. B. BAUER ETAL 3,019,303

TAPE RECORDING-PLAYBACK HEAD

Filed May 22, 1959 2 Sheets-Sheet 2

INVENTORS
BENJAMIN B. BAUER
HARVEY SHERMAN
BY
Brumbaugh, Free, Graves & Donohue
THEIR ATTORNEYS United States Patent Office 3,019,303

Patented Jan. 30, 1962

3,019,303

TAPE RECORDING-PLAYBACK HEAD

Benjamin B. Bauer and Harvey Sherman, Stamford, Conn., assignors to Minnesota Mining & Manufacturing Company, St. Paul, Minn., a corporation of Delaware Filed May 22, 1959, Ser. No. 815,150
4 Claims. (Cl. 179—100.2)

This invention relates to magnetic heads for magnetic tape recording-reproducing apparatus and the like. More specifically, it relates to a new and improved magnetic head structure that is of particular utility in recording-reproducing apparatus designed for operation with very narrow magnetic tape transported at very low speed and adapted to carry intelligence in parallel closely spaced apart channels thereon.

The copending application Serial No. 837,716, filed September 2, 1959, by Goodell, Ivins and Wistrand, for "Magnetic Tape Magazine Changer Mechanism," discloses recording-reproducing apparatus designed for use at a tape transport speed of 1.875 inches per second with magnetic tape .100 inch wide on which stereophonic information is recorded in two channels each .045 inch wide with a .010 inch guard band between them. The spacing between the pole pieces, therefore, cannot exceed .010 inch, yet considerably more than this distance is required to accommodate on the magnetic cores coils of a size adequate to produce a signal output of reasonable amplitude. Moreover, in order to reproduce faithfully the short wavelengths encountered on the tape at high frequencies (e.g., 15 kilocycles per second), the air gap between the pole pieces must be extremely small, i.e., of the order of one micron. The conventional heads currently available are wholly incapable of meeting these stringent specifications.

An object of the invention, accordingly, is to provide a multiple magnetic head that is capable of effective operation with very narrow closely spaced apart channels on a magnetic tape.

A further object of the invention is to provide a new and improved magnetic head structure of the above character in which the air gaps are extremely small and the electrical outputs are of sufficient magnitude for effective amplification in conventional amplifier equipment.

According to the invention, the two magnetic cores of a multiple magnetic head are disposed in planes each at an angle of, say 15° to a plane normal to the tape transport path with their adjacent front air gaps in closely spaced apart relationship. Under these conditions, the rear portions of the cores are spaced apart a sufficient distance to accommodate windings large enough to insure an output signal of reasonable amplitude.

In a preferred embodiment, the two magnetic cores are split in half and like halves of each are rigidly secured in angularly disposed grooves formed in a nonmagnetic support member. The pole pieces are suitably shaped and polished and the pole pieces at the front of the head are coated with a layer of material having a permeability close to unity and approximately one-half the desired air gap width in thickness. The two support members are then assembled with the respective front and rear pole pieces in abutting relation and with windings on the legs carrying the rear pole pieces. The support members are then secured together in any suitable manner and the assembly is filled with a nonmagnetic nonconductive filler material. Finally, the front surface of the head is formed to a desired shape, polished and fitted with a magnetic shield to minimize its sensitivity to external fields.

The invention may be better understood from the following detailed description of a typical embodiment, taken in conjunction with the accompanying drawings, in which.

Figure 1:
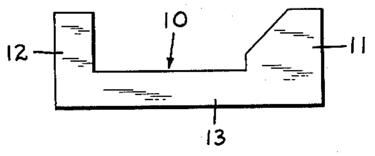
FIGS. 1 and 1A are views in plan and elevation, respectively, of a magnetic core half suitable for use in a magnetic head constructed according to the invention.
Figure 1A:
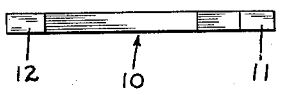

In constructing a magnetic head according to the invention, two pairs of magnetic core halves 10 each shaped substantially as shown in FIG. 1 are prepared. These may be formed of stacked laminations, say, .006 inch thick made from a suitable high magnetic permeability material such as the iron nickel molybdenum alloy marketed under the trade name Hy Mu "80." For a tape channel .045 inch wide, the magnetic core halves 10 may be made from, say, seven such laminations cemented together by any suitable thermo-setting cement such as the product marketed as "Bondmaster No. M–645," the overall thickness of the assembly being about .044 inch. As shown in FIGS. 1 and 1A, the magnetic core halves are substantially U-shaped and have upstanding poles 11 and 12 joined by a base member 13.

Figure 2:
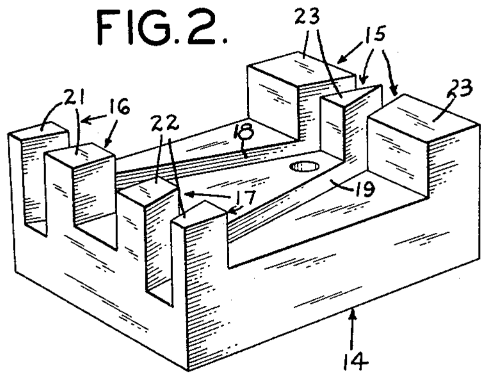
FIG. 2 is a view in perspective of a magnetic core mounting support according to the invention.

As indicated above, in order to maintain close spacing between the pole pieces and yet allow adequate room on the magnetic pole structure for the windings, the magnetic cores are inclined at an angle of the order of 15° to a median line between them. This is accomplished by mounting pairs of pole halves 10 in nonmagnetic metallic support members 14, one of which is shown in FIG. 2. The support members 14 should preferably be made of a material such as No. 303 stainless steel which has a thermal expansion coefficient which is very close to that of Hy Mu "80." Each support member 14 has upstanding spacer members 15, 16 and 17, and grooves 18 and 19 formed in its base for receiving the core halves 10. The grooves 18 and 19 are slightly larger in width than the width of the magnetic core halves 10 and each is disposed at an angle of, say, 15° to a line perpendicular to the front face of the support member 14.

Figure 3:
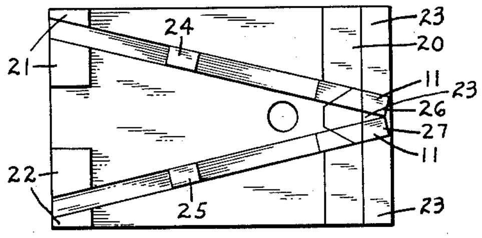
FIGS. 3 and 3A are views in plan and elevation of two magnetic core halves secured in a core mounting support.
Figure 3B:
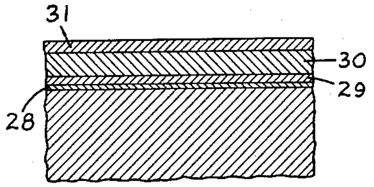
FIG. 3B is a detail of one of the pole faces showing the layers of gap forming material.
Figure 3A:
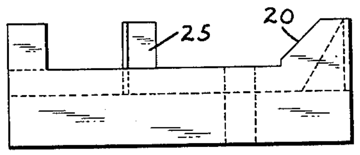

Two of the magnetic core halves 10 are cemented in the slots 18 and 19 of each of two support members 14, as shown in FIGS. 3 and 3A, a suitable thermo-setting cement such as the aforementioned "Bondmaster No. M–645" being used for the purpose, and a 45° relief cut 20 is taken on the back surface of the pole tips 11 to maintain a constant gap depth of about .003 inch over the entire gap width. The upper surfaces 21, 22 and 23 of the spacer members 15, 16 and 17 on the support member 14 and the upper surfaces 24, 25, 26 and 27 on the magnetic core halves 10 are then machined, lapped and polished so as to lie in substantially the same plane.

The air gap at the front of the head is then formed by depositing on each of the pole faces 26 and 27 a layer of material having substantially unity permeability and approximately one-half the desired gap width in thickness. In order to eliminate the need for masking and thereby simplify the manufacturing procedure, the material may be deposited on all of the polished surfaces lying in the plane containing the pole faces 26 and 27.

In a typical head according to the invention, the gap may be formed by depositing on each of the pole faces 26 and 27 in order, a chromium nickel layer 28 (FIG. 3B) approximately 50 Angstroms thick; a copper layer 29 approximately 75 Angstroms thick; a layer of manganese 30 approximately 3000 Angstroms thick; and a final layer of copper 31 about 125 Angstroms thick. The chromium nickel layer 28 and the copper layer 29 effect a strong mechanical bond between the pole pieces and the main deposit 30 of manganese, while the final layer 31 of copper serves as a surface protective coating. Manganese is a highly satisfactory gap material because of its hardness and its low magnetic permeability (near unity).

Figure 4:
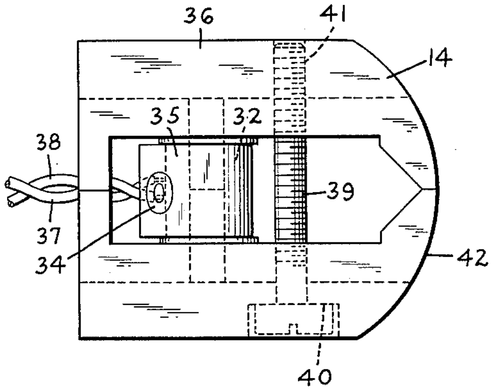
FIGS. 4 and 4A are side and front views, respectively, of an assembled magnetic head according to the invention.
Figure 4A:
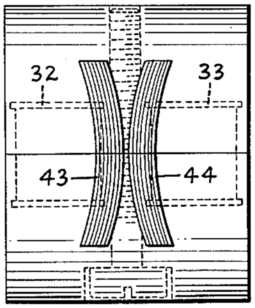
Figure 5:
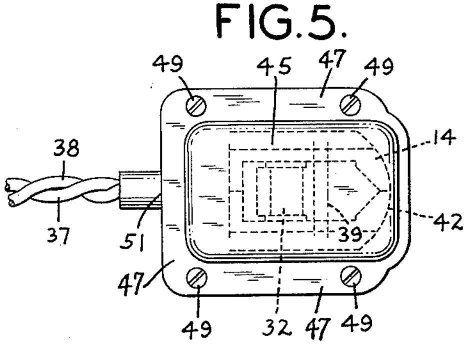
FIGS. 5, 5A and 5B are top, side and front views, respectively, of a completed magnetic head according to the invention enclosed in a magnetic shield.
Figure 5B:
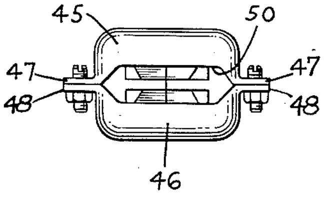
Figure 5A:
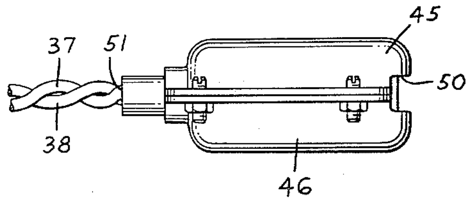

Two assemblies are prepared as described above. Before the two assemblies are secured together, two coils 32 and 33 are slipped over the rear legs of the pole pieces on the magnetic core halves 10, as shown in FIGS. 4 and 4A. Each coil may comprise, for example, 2500 turns of No. 46 enameled wire wound on a bobbin of nylon or other suitable material. Connections to the coils may be made by means of eyelets 34 secured to the ends of a strip 35 of suitable material, such as fish paper, for example, cemented to the coil. Thus, external conductors 37 and 38 may be soldered to the eyelets 34 to which the terminals of one of the coils may also be connected. Similar conductors may be connected to the eyelets 34 on the other coil. This technique provides for strain relief on the coil leads.

The two support assemblies 14 are then secured tightly together by means of a clamping screw 39 which is inserted in an opening 40 in one of the support assemblies and is screwed into a threaded bore 41 formed in the other assembly.

To prevent shifting of parts and insure dimensional stability, the entire assembly is then placed in a suitable fixture and filled with a suitable material such as an epoxy resin, for example. When the resin has set, the front surface is ground to a radius of, say, one-half inch and is then polished. Because of the fact that the magnetic core halves 10 are inclined at an angle of 15° to a median plane through the head, the front portions 43 and 44 of the cores at the front face of the head are slightly curved rather than straight. However, the curvature is small and its effect on the performance of the head is negligible.

The completed head, as shown in FIGS. 4 and 4A is then cemented into a suitable shield comprising two cup-shaped portions 45 and 46 made of suitable material such as, for example, .020 inch Hy Mu "80." The opposed portions 45 and 46 of the shield are provided with opposed flanges 47 and 48 and the opposed faces of the flanges are preferably lapped flat to insure optimum magnetic contact between them. The two shield portions 45 and 46 may be secured together or mounted on a suitable support in recording-reproducing apparatus (not shown) by means of the screws 49. Also, the shield has two cut-away sections 50 and 51 at the front and rear thereof. The front cut-away section 50 allows a magnetic tape to be brought into contact with the head in a recording or a reproducing operation and the cut-away section 51 at the rear provides access for the leads 37 and 38.

From the foregoing, it will be understood that the invention provides a novel and highly effective magnetic head for use with magnetic tape recording reproducing apparatus. By disposing the magnetic cores at an angle to a median line through the head, the pole pieces defining the air gaps may be maintained in closely spaced apart relation while providing adequate space for the pickup windings. Further, by reason of the techniques described above, the magnetic heads may be provided with extremely small magnetic gaps of accurately determined width.

The specific techniques and apparatus described above are obviously susceptible of modification in form and detail within the spirit of the invention. The invention, therefore, is intended to comprehend all such modifications as come within the scope of the following claims.

We claim:

1. In a magnetic head for magnetic tape recording-reproducing apparatus, the combination of a pair of support members each having a base, each said base carrying a pair of substantially U-shaped laminated magnetic core portions disposed generally in the form of a V, each such core portion having spaced apart legs extending outwardly from the base and terminating in a pole face, the adjacent core portion legs at the apex of the V having rear surfaces defining an inclined plane intersecting said base in a line normal to a line bisecting the angle between said core portions, said plane also containing the colinear rear edges of the pole faces terminating said adjacent core portion legs, and said adjacent core portion legs including curved front surfaces containing the colinear front edges of said pole faces, having a common axis of symmetry lying in the plane of said pole faces and parallel to the front and rear edges thereof, a layer of gap defining material on at least one pole face of each core portion, means retaining said support members in assembled relation with the pole faces on the core portions in substantial registry and with the layers of gap defining material in engagement to form two magnetic cores having adjacent closely spaced gaps at one end and widely spaced apart core portions at the opposite end, and windings carried by said widely spaced apart core portions.

2. A magnetic head as defined in claim 1 in which said gap defining material comprises a layer of low permeability material.

3. In a magnetic head for magnetic tape recording-reproducing apparatus, the combination of a pair of support members each having a base and cooperating spacer members extending away therefrom, means forming a substantially V-shaped groove inside each of said bases, a plurality of substantially U-shaped laminated magnetic core portions each having spaced apart upstanding poles terminating in pole faces and joined by a base, the adjacent core portion legs at the apex of the V having rear surfaces defining an inclined plane intersecting said base in a line normal to a line bisecting the angle between said core portions, said plane also containing the colinear rear edges of the pole faces terminating said adjacent core portion legs, and said adjacent core portion legs including front surfaces containing the colinear front edges of said pole faces having a common axis of symmetry lying in the plane of said pole faces and parallel to the front and rear edges thereof, means mounting said core portions with their bases in the arms of said V-shaped grooves and with their poles extending away from said support member bases, a layer of gap defining material on the pole faces of the poles nearest the apices of said V-shaped grooves, means retaining said support members in assembled relation with the pole faces thereon in substantial registry and with the gap defining layers on one pair of core portions in engagement with the gap defining layers on the other pair of core portions, respectively, and windings on each pair of opposed poles farthest from the apices of said V-shaped grooves, respectively.

4. A magnetic head for magnetic tape recording-reproducing apparatus as defined in claim 3 together with a magnetic shield for said head comprising cooperating opposed portions enclosing said head, means retaining said cooperating portions in assembled relation, and means providing access for a magnetic tape to said head in the vicinity of said gap forming layers.

References Cited in the file of this patent

UNITED STATES PATENTS

| | | |
|---|---|---|
| 2,608,621 | Peterson | Aug. 26, 1952 |
| 2,615,989 | Thad | Oct. 28, 1952 |
| 2,658,114 | Buhrendorf | Nov. 3, 1953 |
| 2,866,011 | Kornei | Dec. 23, 1958 |

FOREIGN PATENTS

| | | |
|---|---|---|
| 707,699 | Great Britain | Apr. 21, 1954 |
| 800,233 | Great Britain | Aug. 20, 1958 |